United States Patent
Febonio et al.

(10) Patent No.: US 8,364,122 B2
(45) Date of Patent: Jan. 29, 2013

(54) DELAYED DELIVERY MESSAGING

(75) Inventors: Barbara Febonio, Rome (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 11/936,473

(22) Filed: Nov. 7, 2007

(65) Prior Publication Data

US 2008/0153523 A1    Jun. 26, 2008

(30) Foreign Application Priority Data

Dec. 21, 2006 (EP) ..................................... 06126807

(51) Int. Cl.
*H04Q 11/00*    (2006.01)
(52) U.S. Cl. .................. 455/412.1; 455/414.1; 455/466; 370/480; 370/491
(58) Field of Classification Search ............... 455/412.1, 455/414.1, 466, 414, 1; 379/88.22; 370/480, 370/493
See application file for complete search history.

(56) References Cited

U.S. PATENT DOCUMENTS 6,119,014 A    9/2000    Alperovich et al.
2002/0077131 A1*    6/2002    Mizell et al. .................. 455/466
2002/0178231 A1*    11/2002    Matsa et al. .................. 709/206
2004/0214588 A1*    10/2004    Tanimoto ....................... 455/466
2006/0210034 A1*    9/2006    Beadle et al. ............... 379/88.22
2008/0026776 A1*    1/2008    Neil et al. ...................... 455/466

FOREIGN PATENT DOCUMENTS

| EP | 1613102 A1 | 1/2006 |
| EP | 1648126 A2 | 4/2006 |
| WO | 2005107290 A1 | 11/2005 |

* cited by examiner

*Primary Examiner* — Dwayne Bost
*Assistant Examiner* — William F Rideout
(74) *Attorney, Agent, or Firm* — Yee & Associates, P.C.; Libby Toub (57) ABSTRACT

A software program executable on a mobile telephone suitable to cause said telephone to interrogate a distant recipient telephone by means for example of JTAPI to determine whether the recipient telephone is turned on or not. In a case where it is determined that the recipient telephone is turned on, an SMS message is sent to the recipient telephone. In a case where the voice connection cannot be made it is determined that the recipient telephone is turned off, and a further attempt to make a voice connection is made after a predetermined period. Further attempts are made repeatedly until it is determined that the recipient telephone is turned on, and an SMS message is sent to the recipient telephone, or until sending of the SMS is cancelled by a user.

3 Claims, 5 Drawing Sheets

DELAYED DELIVERY MESSAGING

FIELD OF THE INVENTION

The present invention relates to electronic messaging services where there is a significant and unpredictable delay between the moment of transmission and receipt, and more particularly to certain practical disadvantages inherent in this paradigm.

BACKGROUND OF THE INVENTION

Over recent years a number of communications techniques have evolved which, whilst using digital networks for transmission, nor to some extent the delayed delivery paradigm of traditional postal services rather than real time communications, although such real time communications are often supported by the same network. According to the delayed delivery paradigm, a message is composed in its entirety, and submitted to a named addressee, on the understanding that the addressee will at some undetermined point in the near future receive the message. Examples of such delayed delivery methods include Short Message Service (SMS) transmissions over cellular telephone networks, and electronic mail (email) over the internet. The advantages of such methods over real time communications include the fact that the author is not under pressure to submit his message until he is fully satisfied with it, and that the author can be sure the addressee will eventually receive the message whether or not they are at the moment of transmission able to receive the message.

The Short Message Service—Point to Point (SMS-PP) is defined in GSM recommendation 03.40. According to this mechanism, messages are submitted from an originating device to a Gateway Message Service Centre via a service channel of the network. The GMSC stores the message, and attempts to forward it to the destination device defined in the message. Where it proves impossible to successfully forward the message, the GSMC queues the message for a further attempt in the future. The time at which a message actually reaches the destination device is therefore entirely unpredictable, since it depends not only on the delays and inherent in the system, and the risks associated with the use of a service channel for data transmission but further on the time at which the user of the destination device happens to turn it on.

Figure 1:
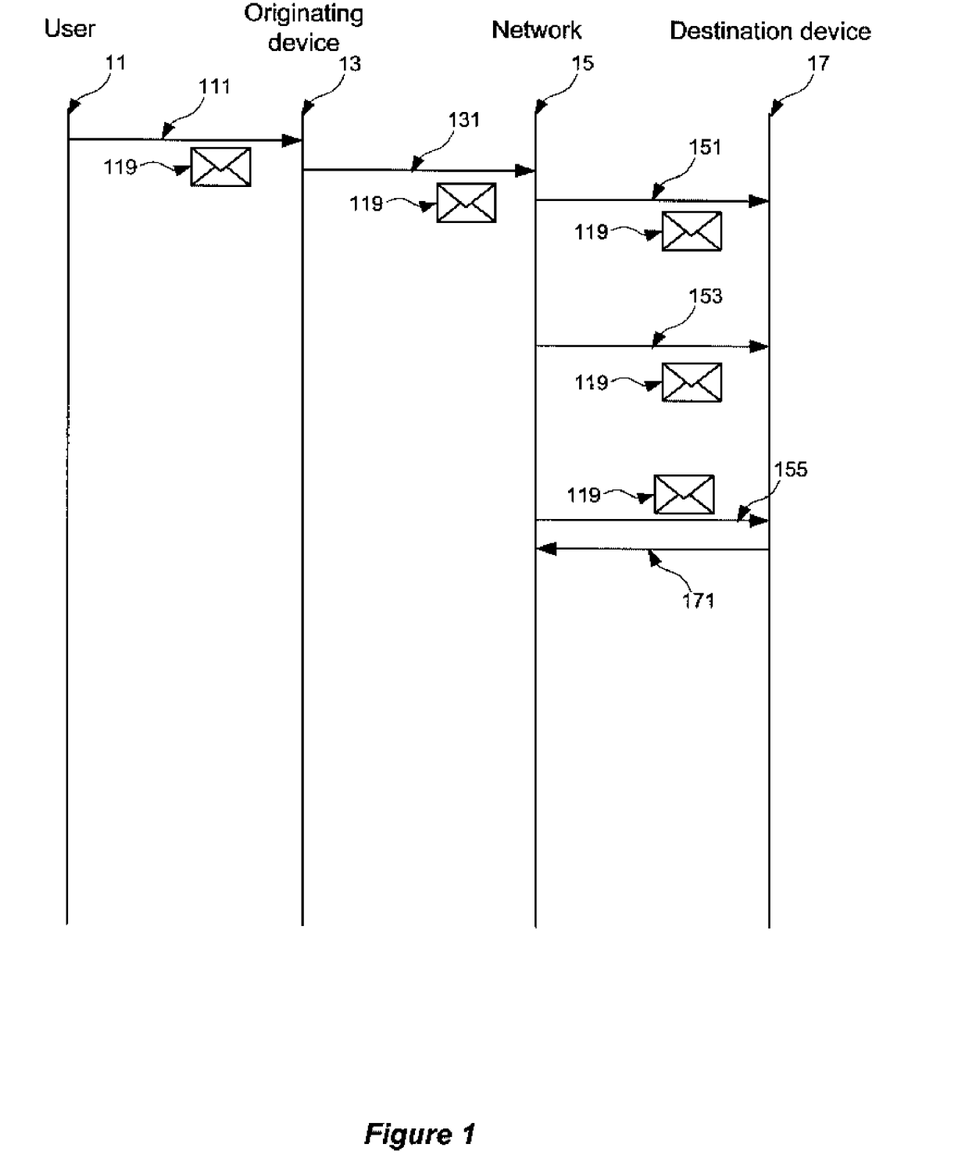
FIG. 1 shows the sequence of steps involved in the delivery of an SMS message 119 in a case where a destination device 17 is switched off.

FIG. 1 shows the sequence of steps involved in the delivery of an SMS message 119 in a case where a destination device 17 is switched off. The message 119 is composed as indicated by communication line 111 by a user 11 and passed on from the originating device 13 to the network 15 as indicated by communication line 131. The network sends the message on to the destination device 17 as indicated by communication line 151, and in the event where the destination device is switched off or otherwise unable to receive the message, and accordingly does not acknowledge receipt of the message, the network retransmits the message as indicated by communication lines 153 and 155, until the message is successfully delivered and an acknowledgement 171 is eventually received.

The delayed delivery paradigm can however bring certain disadvantages. Imagine the scenario where the author sends a friend an SMS "give me a ring when you're free", but actually sees the addressee before he gets the message. Then, when the addressee turns on his phone, he gets the message, and calls the author for no reason.

In other words, when sending an SMS message the user is not aware of the time at which the message will be delivered although he can be advised when the message is delivered. This can mean that the message is received when it is no longer necessary.

Certain prior art publications consider some aspects of these issues.

EP1648126A2 relates to a method and system of automatically sending a message based on predefined sending condition. The method comprises registering a message sending condition in a first communication terminal device. Thereafter, the method comprises obtaining presence information of a second communication terminal device user at the first communication terminal device via communication network. The method further comprises determining whether the message sending condition is met and thereafter, sending the message if the message sending condition is met.

U.S. Pat. No. 6,119,014 relates to a method and system of displaying short messages based on user defined indicators. The user defined indicators can be for example, a predefined time and a predefined location in a service area etc. The method includes receiving and storing of a short message and a location indicator by an organizational node in a memory associated with the organizational node. The location indicator is associated with the location information sent by originating mobile terminal. The method further comprises determining the position of receiving mobile terminal in cellular network. Thereafter, displaying the short message based on the location indicator. The method further comprises moving the short message after display to an action database. Thereafter storing an additional indicator associated with the short message defined by user of the receiving mobile terminal in the action database. The short message is subsequently displayed based on the additional location indicator.

WO2005107290A1 relates to a method and system for sending and receiving messages. The method of sending comprises composing a message, determining at least one delivery condition and sending the message. The examples of delivery condition include an expiration time or date, location parameter, phone call parameter etc. The method of receiving comprises receiving a message and delaying the notification of the message to the user based on the delivery condition associated with the message. The method of receiving further comprises generating a new message notification to the user when the delivery condition is met.

EP 1613102A1 relates to a method and system allowing a subscriber to flexibly control the delivery of a short message. The system comprises a database storing instructions for handling messages by a first subscriber. The examples of instructions include forwarding all the short messages from a second subscriber to a third subscriber. The sending as well as the receiving subscriber may specify the instructions for short message handling. The method comprises storing the short message handling instructions in the database. The method further comprises sending or receiving a short message including the sending and receiving party identification information. Thereafter, the method comprises performing a lookup in the database for the instructions and executing the instructions defined in the database.

The 3GPP specification for SMS called "3GPP TS 23.040 V3.9.0 (2002-06)", which is downloadable from http://www.3gpp.org/ftp/tsg_t/TSG_T/TSGT_04/Docs/PDFs/TP-99126.pdf provides for the possibility of cancelling an already-submitted message, with regard to the "9.2.3.19 TP-Command-Type (TP-CT)" command, which has the effect "Delete previously submitted Short Message".

It is an object of the invention to address certain drawbacks of the prior art, in particular by making it unnecessary for a user to pay for the unnecessary transmission of a message, whilst ensuring that an intended recipient does not receive messages which are no longer relevant.

SUMMARY OF THE INVENTION

According to the present invention there is provided a method of handling an electronic message comprising the steps of identifying a destination device for receipt of said message at an originating device, determining at said originating device whether said destination device is active; and in a case where it is determined that said destination device is active, transmitting said electronic message to a distribution server, for retransmission thereby to said destination device.

Further according to the present invention there is provided a system comprising means adapted to carry out the steps of the method described above.

Further according to the present invention there is provided a computer program comprising instructions for carrying out the steps of the method described above when said computer program is executed on a device.

Further according to the present invention there is provided a computer readable medium having encoded thereon a computer program as described above.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION OF THE PREFERRED EMBODIMENT

Generally, when sending a SMS or other such delayed delivery messages a user is not aware of the time at which message will be delivered. The only information generally available is the acknowledgement that a message has in fact been delivered. This can cause a message to be sent when it is not necessary.

Figure 2:
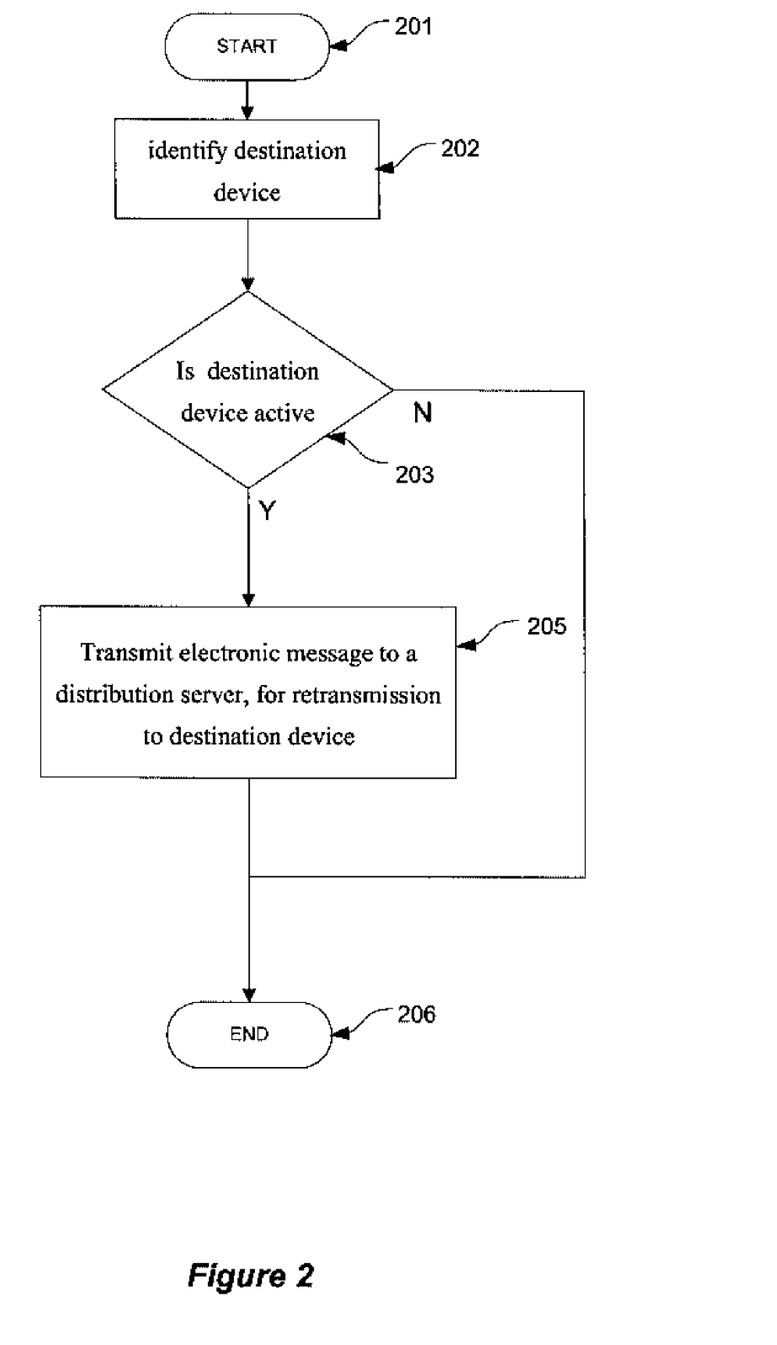
FIG. 2 shows a first embodiment.

FIG. 2 shows a first embodiment. As shown in FIG. 2, there is provided a method of handling an electronic message comprising the steps of identifying a destination device for receipt of said message at an originating device 201; determining at said originating device whether said destination device is active 202 and, in a case where it is determined that said destination device is active; transmitting said electronic message to a distribution server at step 205, for retransmission thereby to said destination device. In other words, it is determined from the originating device 13 whether the destination device 17 is able to receive a message before the message is sent, thereby avoiding the risk that the message is sent, but only received when no longer required.

Figure 3:
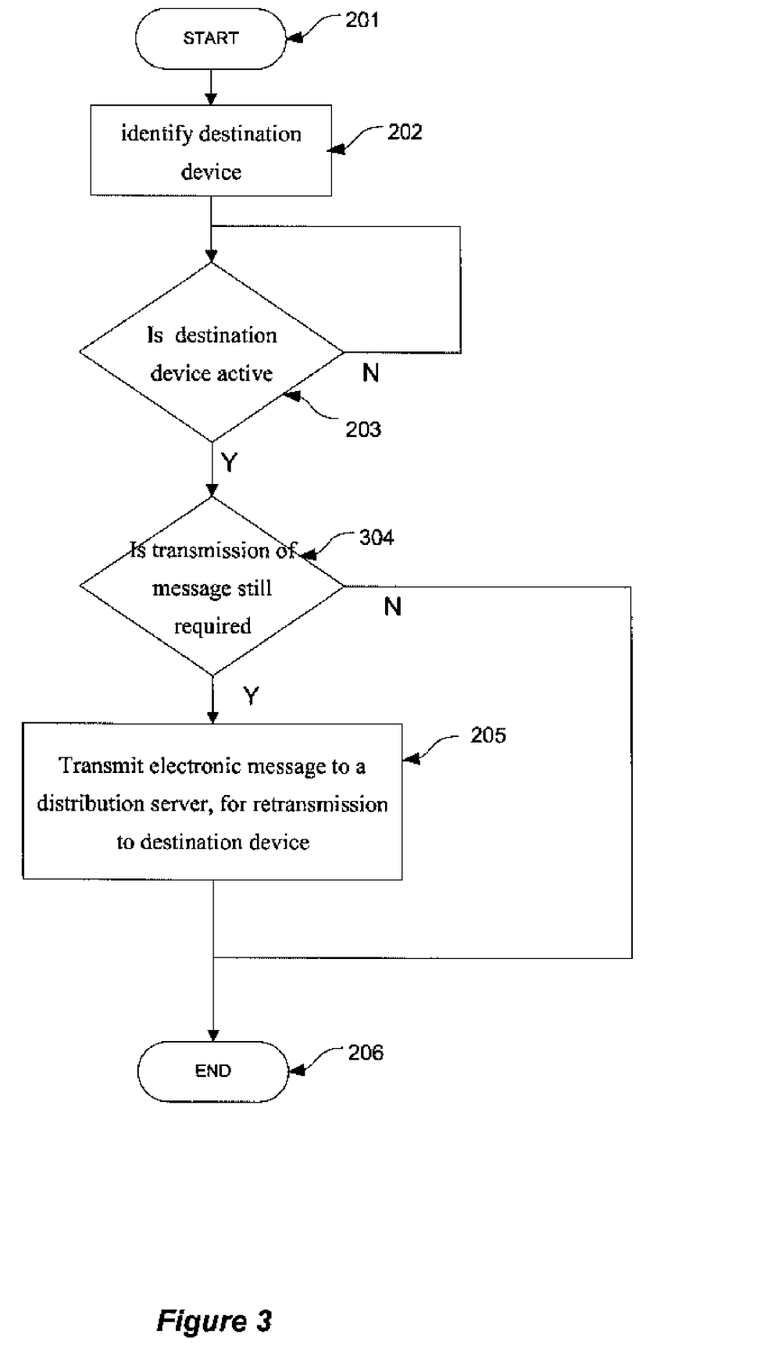
FIG. 3 shows certain developments of the first embodiment.

FIG. 3 shows certain developments of the first embodiment. As shown here, in a case where said destination device is determined not to be active at step 203, the step 203 of determining whether the destination device is active or not is carried out repeatedly or at predetermined intervals until it is determined that the destination device is active. By this means, it can be determined not only that the message would not be received at the moment of composition, but furthermore a point in time a check that the message could be successfully delivered is identified. Still more preferably, in a case where said destination device 17 is determined to be active a further step of determining whether or not transmission of said electronic message is still required is carried out at step 304. By this means, where in the period intervening between composition of the message and the moment at which it is determined that it could successfully be relayed to the destination device, the content of the message has expired, its transmission can be prevented. For example, when it is determined that the destination device 17 has become active, the originating device may display a message, produce a tone etc. to inform the user 11 that the destination device 17 is now able to receive the message 119, and requesting that the user confirm whether transmission is still required. Accordingly the user has an opportunity to prevent transmission in a case where such transmission is no longer desired.

As a further option, the user may be offered the option of amending the message, for example to take into account events having taken place in the period between composition and transmittal of the message 119.

Figure 4:
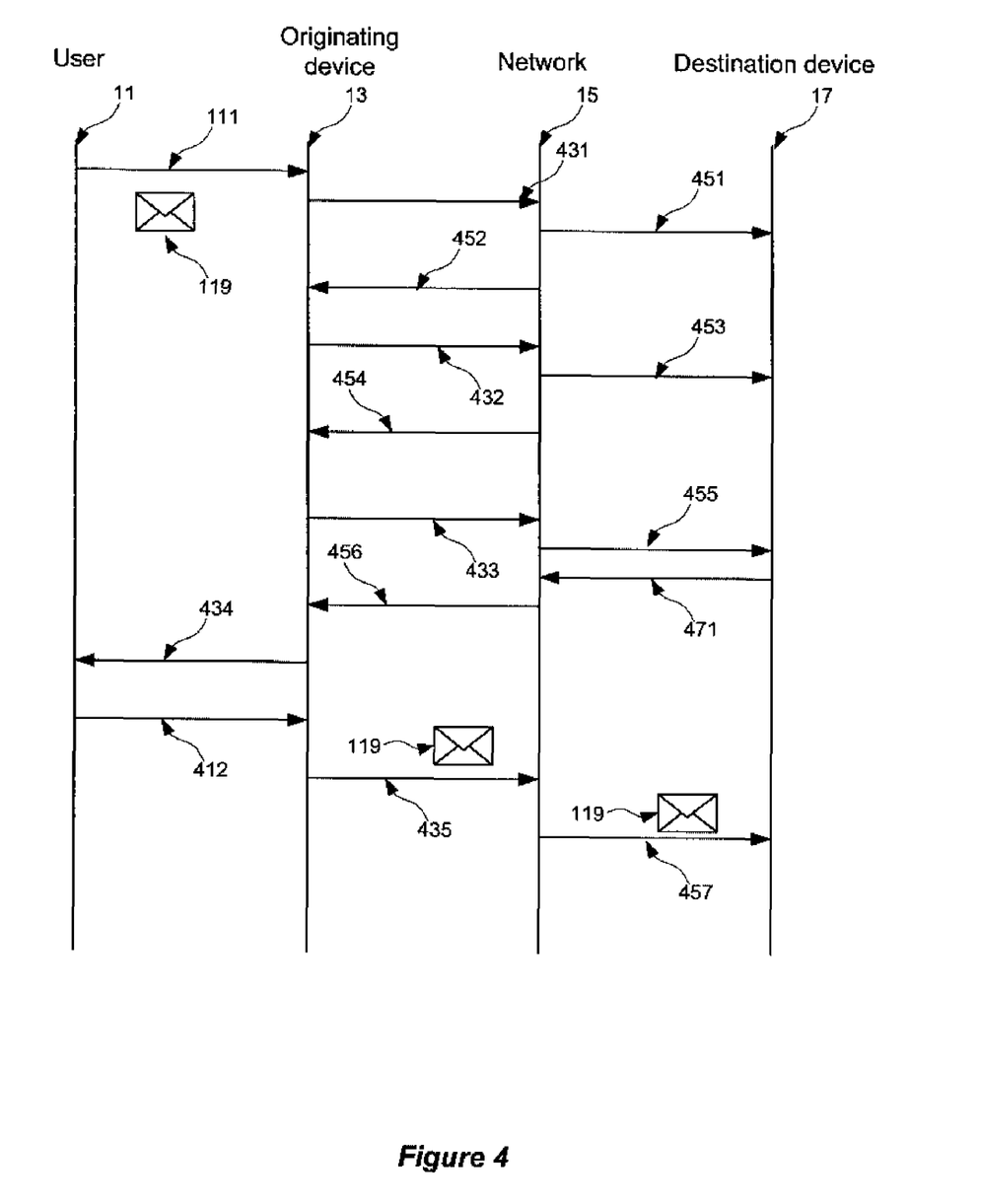
FIG. 4 shows a further embodiment of the invention.

FIG. 4 shows a further embodiment of the invention. As described above, a user 1 composes a message 119. This message 119 is stored at the originating device 13, and a query 431 sent to the network 15 requesting notification of the status of the destination device 17. The network polls the destination device 17 by communication line 451, and in the absence of a response from the destination device the network responds to the originating device as shown by communication line 452, to inform the originating device that the destination device is not able to receive the message. Where the destination device is thus found not to be active, this polling process is carried out repeatedly, so that as shown a further query 432 is sent to the network 15 requesting notification of the status of the destination device 17. The network polls the destination device 17 again as indicated by communication line 453, and in the absence of a response from the destination device the network responds to the originating device as shown by communication line 454, to inform the originating device that the destination device is not able to receive the message. When eventually the destination device 17 does become active, when the polling process is carried out where query 433 is sent to the network 15 requesting notification of the status of the destination device 17, and the network polls the destination device 17 again as indicated by communication line 455. On this occasion, however, a response 471 is received from the destination device over the network, which in turn responds to the originating device as shown by communication line 456, to inform the originating device that the destination device is now able to receive the message. The user 11 is notified of this change of status by a message 434, and in return confirms that the message should still be transmitted to the destination device, whereupon the originating device transmits the message 119 to the network in communication 435, and the message is immediately passed on to the destination device 17 in communication 457.

Comparison of FIGS. 1 and 4 shows that while in the prior art the message 119 is transmitted at least once from the originating device 13 to the network 15, and from the network 15 to the destination device 17 repeatedly, according to the embodiment of FIG. 4 in the case where the message is successful received at the destination device the message is transmitted once from the originating device 13 to the network 15, and from the network 15 to the destination device 17, and in a case where transmission is cancelled, the message is not transmitted at all. This leads to an overall reduction in demand on network resources. The approach may also have implications for user privacy, since it reduces the number of messages that are stored on the network, and reduces the time for which they need to be stored on the network. Still further, in a case where transmission is cancelled, the user will not be charged for the unnecessary transmission of the message.

Of course, in a case where the user fails to confirm that the message should be retransmitted, either by failing to reply to communication 434, or by responding in the negative in communication 412, communications 435 and 457 would not occur. The system may be configured to send the message automatically unless the user expressly cancels transmission by responding in the negative to communication 434 within a predetermined time. The system may be configured to delete message 119 from memory automatically when it is determined that a message should no longer be transmitted, or that is should be maintained in memory for a predetermined time before deletion, for example with a new classification such as "trash", or that the message be retained in memory indefinitely, possibly with a new classification such as "draft", etc.

It may also be envisaged that messages may be proposed for transmission on a cyclic basis. Certain messages may be associated with repetitive events so that even if it becomes undesirable to transmit the message on one occasion, it may be appropriate to recommence the process described above for the same message and destination device at some later time. Imagine the scenario where the user 11 has a weekly appointment with the owner of destination device 17, and is in the habit of confirming that he will attend any given appointment one hour before the time of the appointment by SMS. Regardless of the successful transmission in previous weeks, the steps described above may be automatically reinitiated by the user device each week to determine when the destination device 17 is able to receive the message, and when this is determined to be the case, prompting the user to determine whether the message should still be sent.

The period between polling attempts, that is, between messages 431, 432 and 433 in the above example may be user defined. Periods such as every few minutes, every half hour, every hour, etc. may prove to be suitable depending on the compromise between network resource demand and responsiveness to be struck.

It may be desirable to notify the user of developments between composition of the message and receipt of the communication 434, for example to inform the user that although the message has been properly composed, the destination device is not at present active. Such information may be refreshed, for example, after communications 452 and 454.

As a further development, transmission of a pending message may be cancelled automatically, and a cancellation confirmation request message automatically generated, if the originating device 13 detects receipt of a communication from the destination device 17, or still further from the user associated with the destination device 17. This may be realized with reference, for example, to the "address book" data stored on the user device 13, from which details of the various alternative means of communication available to the user associated with the destination device 17 may be determined. For example, if it is determined the address book entry containing the telephone number of the destination device 17 also contains alternative telephone numbers, a specific email address data etc, any communication received at the originating device 13 from one of these associated alternative communication means may be treated as triggering the automatic cancellation of transmission of the message 119.

As a still further development, the user may at any point, in particular after a predetermined delay, or in the event of the destination device becoming active after a predetermined delay, be offered the opportunity to convert the message from a first format to a second for transmission. For example, the user may be offered the option of sending the message as an email instead of an SMS message. This may be appropriate for example if it becomes clear that for whatever reason the user of the destination device is not using that device, so that the original message format no longer seems worth pursuing, even though it is still desired to send the message.

As an alternative to the network notifying the originating device 13 of each failed attempt to contact the destination device 17, i.e. in communications 452 and 454, the network may alternatively simply not respond to the queries 431 and 432 from the originating device, which according to this approach the originating device may treat as an implicit notification that the destination device is inactive. This approach has the further advantage of further reducing network traffic.

According to certain embodiments, the present invention may be realised using Java® code or similar code that may be delivered to mobile telephone handset or similar device over the cellular network to which it belongs. Software may alternatively be installed on the device in communication with another device such as a personal computer, etc.

Where Java® code is used, the Java Telephony Application Programming Interface (JTAPI API) may offer suitable functionality to check receiver availability as described hereafter.

The JTAPI API defines a Connection object, whose purpose is to describe the relationship between a Call object and an Address object. A Connection object exists if the Address is a part of the telephone call. Each Connection has a state which describes the particular stage of the relationship between the Call and Address. These states and their meanings are described below. The Connection has a set of specific associated state that are: IDLE, DISCONNECTED, INPROGRESS, ALERTING, CONNECTED, UNKNOWN, FAILED. By accessing the status for the Destination device, it can be determined whether or not it is active and accordingly whether or not the message 119 should be transmitted as described above.

All events pertaining to the Connection object are reported via the CallListener interface on the Call object associated with this Connection. In the core package, events are reported to a CallListener when a new Connection is created and whenever a Connection changes state. Listeners are added to Call objects via the Call.addCallListener( ) method and more indirectly via the Address.addCallListener( ) and Terminal.addCallListener( ) methods.

So mainly the decision as to whether or not the message 119 should be transmitted can be based on following check:
   this.getState( )==Connection.CONNECTED or Connection.ALERTING The complete class specification and also state transition is reported below:

From one perspective, an application may view a Call only in terms of the Address/Connection objects which are part of the Call. This is termed a logical view of the Call because it ignores the details provided by the Terminal and Terminal-Connection objects which are also associated with a Call. In many instances, simple applications (such as an outcall program) may only need to concern itself with the logical view.

In this logical view, a telephone call is viewed as two or more endpoint addresses in communication. The Connection object describes the state of each of these endpoint addresses with respect to the Call.

Connection objects are immutable in terms of their Call and Address references. In other words, the Call and Address object references do not change throughout the lifetime of the Connection object instance. The same Connection object may not be used in another telephone call. The existence of a Connection implies that its Address is associated with its Call in the manner described by the Connection's state.

Although a Connection's Address and Call references remain valid throughout the lifetime of the Connection object, the same is not true for the Call and Address object's references to this Connection. Particularly, when a Connection moves into the Connection.DISCONNECTED state, it is no longer listed by the Call.getConnections( ) and Address.getConnections( ) methods. Typically, when a Connection moves into the Connection.DISCONNECTED state, the application loses its references to it to facilitate its garbage collection.

Connections objects are containers for zero or more TerminalConnection objects. Connection objects are containers for zero or more TerminalConnection objects. Connection objects represent the relationship between the Call and the Address, whereas TerminalConnection objects represent the relationship between the Connection and the Terminal. The relationship between the Call and the Address may be viewed as a logical view of the Call. The relationship between a Connection and a Terminal represents the physical view of the Call, i.e. at which Terminal the telephone calls terminates. The TerminalConnection object specification provides further information.

Below is a description of each Connection state in real-world terms. These real-world descriptions may have no bearing on the specifications of methods, but they serve to provide a more intuitive understanding of what is going on as several methods in this specification state pre-conditions based upon the state of the Connection.

Connection.IDLE This state is the initial state for all new Connections. Connections which are in the Connection.IDLE state are not actively part of a telephone call, yet their references to the Call and Address objects are valid. Connections typically do not stay in the Connection.IDLE state for long, quickly transitioning to other states.

Connection.DISCONNECTED This state implies it is no longer part of the telephone call, although its references to Call and Address still remain valid. A Connection in this state is interpreted as once previously belonging to this telephone call.

Connection.INPROGRESS This state implies that the Connection, which represents the destination end of a telephone call, is in the process of contacting the destination side. Under certain circumstances, the Connection may not progress beyond this state. Extension packages elaborate further on this state in various situations.

Connection.ALERTING This state implies that the Address is being notified of an incoming call.

Connection.CONNECTED This state implies that a Connection and its Address is actively part of a telephone call. In common terms, two people talking to one another are represented by two Connections in the Connection.CONNECTED state.

Connection.UNKNOWN This state implies that the implementation is unable to determine the current state of the Connection. Typically, methods are invalid on Connections which are in this state. Connections may move in and out of the Connection.UNKNOWN state at any time.

Connection.FAILED This state indicates that a Connection to that end of the call has failed for some reason. One reason why a Connection would be in the Connection.FAILED state is because the party was busy.

Applications running on a terminal such as the originating device may monitor for when incoming calls are presented, with observers. An incoming telephone call to a Terminal is indicated by a TerminalConnection to that Terminal is in the RINGING state, for example, confirms that the destination device is active. The Call object has the connections allowing the use of getConnections( ) to obtain the array of connection associated with the call, so that it is then possible to query the Connection by mean of getTerminalConnections( ) and thereby obtain the state of terminal connection.

Thus, if the originating device uses the JTAPi API to initiate call and connection object for a call between the originating device and the destination device, it can then interrogate the connection object to determine whether it is in the "Connected" or "alerting" state, which may be taken as indicating that the destination device is active. The call can then be aborted, and the message 234 issued to the user as discussed above.

While this approach may possibly cause the Destination device to register a "missed call", or even to briefly start ringing, this will only occur where the destination device is in fact turned on. Under these circumstances the arrival of the message 119 shortly thereafter will serve to explain and justify the destination device's activity.

One possible solution to this potential drawback may lie in delivering additional code to the destination device to allow ringing of the phone only if the duration of the connection exceeds a specific value greater than the one used by the present invention to establish the status of the destination device. So for example if the connect( ) method used by SMS feature will last 1 second, the ring will be "enabled" for connections of 2 seconds or more.

Figure 5:
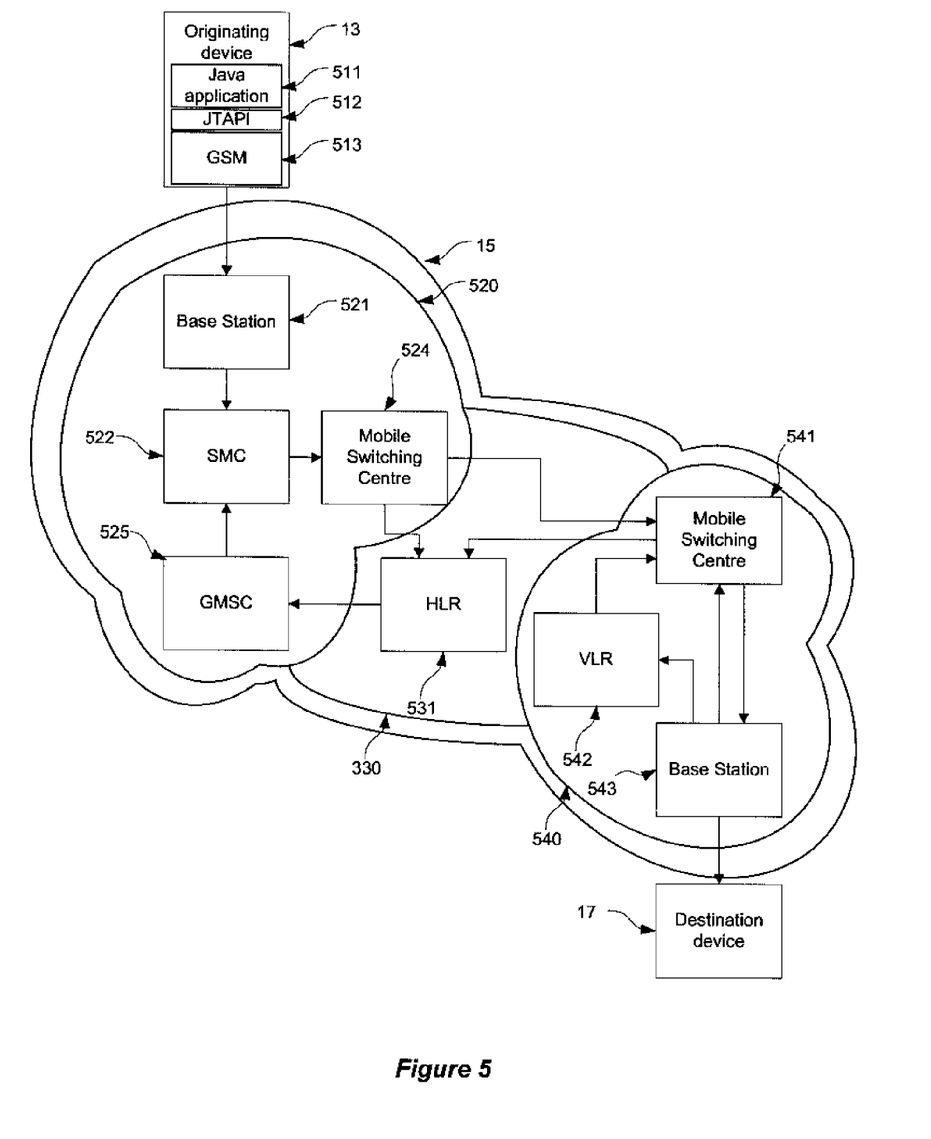
FIG. 5 shows components of a system implementing embodiments of the invention.

FIG. 5 shows components of a system implementing embodiments of the invention. As shown in FIG. 5, there is provided an originating device 13, a network 15 and a destination device 17 as described above. The originating device 13 incorporates a Java application 511 capable of implementing relevant parts of the JTAPI API 512 including the various JTAPI functions as described above. The originating device 13 further incorporates a cellular network interface, such as a GSM interface, which can be accessed by means of the JTAPI API, and accordingly by a Java application running on the originating device 13.

The network 15 is here shown broken down into the network of the originating device 520, the network of the destination device 540 and the connecting network infrastructure 530. As shown, the originating device's network 520 comprises a base station in communication with the originating device 13 and a short message center 522. The SMC 522 is, in turn, in communication with a mobile switch center 524 and a SMS gateway MSC 524.

The destination device's network meanwhile comprises a base station 543 in communication with the destination device 17 and a mobile switching centre 541, and also with a Visitor Location Register 542.

As described above, once a message 119 has been composed at the originating device, and the destination device identified, the application 511 running on the originating device 13 will determine whether the Destination device 17 is active or not. As described above, this may be done by initiating a connection from the originating device to the destination device. The Originating device network's MSC 524 is the originating device's point of contact with other networks. In order to initiate a call, the MSC uses the connecting network infrastructure 530 which may comprise, for example, the SS7 network to interrogate the current position of the destination device 17 from the home location register (HLR) 531, which as shown in FIG. 5 is associated with the connecting network infrastructure 530. As shown the HLR 531 receives information from the MSC 541 of the destination device's network 541 as to the location of the Destination device. On the basis of information retrieved from the HLR 531, the MSC 524 is able to identify and communicate with the destination device's associated MSC 541. The destination device's network 541 comprises a Visitor Location Register (VLR) 542 which contains temporary information about the destination device 17, including mobile identification and the cell (or a group of cells) where the mobile is currently situated. Using information from the VLR 542, the destination device's MSC 541 is able to switch a connection to the Base Station 543 presently serving the destination device. The JTAPI API 512 is used as described above, and as the connection proceeds though these steps the JTAPI "call" and "connection" objects will be initialised and updated, providing a means for the application 511 to easily access information as to the call status. As described above with reference to FIG. 2, if it proves impossible to establish a connection to the destination device, the application will simply wait for a predetermined period, and then try once again to establish a connection. Only when it is determined, for example, by reference to the relevant JTAPI objects that a connection has been established, and accordingly that the destination device is available to receive the message 119, with the application proceeding to transmit the message 119 to the SMC 522 of the originating device's network The SMC (Short Message Center) 522 is adapted to store and forward messages from the originating device 13. The GMSC is a gateway MSC that can also receive short messages. The gateway MSC is the originating device's point of contact with other networks. On receiving the message 119 from the short message centre 522, the GMSC uses the connecting network infrastructure 530 which may comprise, for example, the SS7 network to interrogate the current position of the destination device 17 from the home location register (HLR) 531, which as shown in FIG. 5 is associated with the connecting network infrastructure 530. As shown, the HLR 531 receives information from the MSC 541 of the destination device's network 541 as to the location of the Destination device. HLR is the main database in a mobile network. On the basis of information retrieved from the HLR 531, the GMSC 525 is able to pass the message 119 on to the network to which the destination device belongs via the MSC 524 of the originating device's network, and accordingly to the destination device's associated MSC 541. The destination device's network 541 comprises a Visitor Location Register (VLR) 542 which contains temporary information about the destination device 17, including mobile identification and the cell (or a group of cells) where the mobile is currently situated. Using information from the VLR 542, the destination device's MSC 541 is able to switch the message 119 to the Base Station 543 presently serving the destination device, which then transmits the message 119 to the destination device. In the case of SMS messages, the message is passed over the signalling channels so the mobile can receive messages even if a voice or data call is going on in parallel.

It will be appreciated that any cellular interface offering SMS like messaging features may replace the GSM interface. Such features are commonly included in second generation a later mobile networks such as iDEN and D-AMPS. Where other delayed delivery messages are used such as emails and the like, the interface may be varied still further, to any permitting transmission of suitable data flows.

For the sake of generality the originating device and destination device have been described as belonging to separate networks 520 and 540. It will of course be appreciated that the two devices may very well belong to the same network.

It will be appreciated that any mechanism allowing the status of a connection to the destination device can be adopted in place of the JTAPI API. Still further, means to determine whether the destination device is active without recourse to establishing a connection may be envisaged, for example by reference to the VLR 531 and HLR 542. This approach may be preferable in some situations since it would not call for an actual call to be initiated, thereby obviating the risk of unnecessarily causing the destination device to ring. On the other hand, it would necessitate cooperation from the network providers.

Accordingly, the originating device 13 may be considered to determine whether the destination device is active by interrogating said destination device, or by interrogating a communications network with which the destination device is associated, from the originating device.

Certain protocols specifically provide for the establishment of the status of network devices, especially with the introduction of the concept of presence into mobile providers' 3G works. One of the 3G main concepts is IMS (IP Multimedia Subsystem). SIP (Session Initiation protocol) and SIMPLE are relevant protocols enabling many of IMS functions.

Session Initiation Protocol (SIP) is an application-layer control (signalling) protocol for creating, modifying, and terminating sessions with one or more participants. These sessions include Internet telephone calls, multimedia distribution, and multimedia conferences. In particular, SIP defines a method of passing instant messages between endpoints, similar to SMS messages, including the sending of such messages to ordinary GSM mobile telephones. Furthermore, an instant messaging protocol based on SIP, called SIMPLE, has been proposed, which can also carry presence information, conveying a person's willingness and ability to engage in communications. A presence server collects information from different sensors both inside and outside the providers' network and puts it into a presence document for each user. Provider network internal components are one of the sources of presence information. So in general one can subscribe to the presence document changes of a certain user and when the user's phone will be turned on or off a notification and an updated presence document will be forthcoming. One can also query the presence document at any time to check any part of it on demand.

Thus, an originating device having access to such a system may refer to the presence document of the destination device or an associated user to determine his status, and transmit a message, whether by SMS or otherwise only in a case where the destination device is found to be active.

According to a still further embodiment, in a case where the destination device is found not to be active, the system is able to try different destination devices for the same destination user. For example, in a case where User A composes a message 119 on originating device 13 to send to User B, User B is associated in an address book stored on the originating device containing multiple contact addresses such as telephone numbers, email addresses, etc. to which a the message might be sent. Where a selected, first or preferred one of these addresses proves not to be reachable, all the different target addresses may be polled as described above for example in a cyclic manner until a valid active address is found.

Still further, prior to transmitting said message once a valid active address is identified, the user may be prompted to confirm whether the identified address should in fact be used, or whether polling should continue until a preferred address becomes usable. Other options might be to discard the message, or to edit it, for example in a case where a destination users personal address in not active, but his work address is active, in which case it may be appropriate to modify the message for the change in context.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of handling an electronic message by an originating device that originates the electronic message, comprising the steps of:
    said originating device identifying a destination device for receipt of said;
    determining at said originating device whether said destination device is active, wherein said step of determining at said originating device whether said destination device is active comprises interrogating said destination device from said originating device in which said interrogation is performed by means of telephony application programming interface commands;
    said originating device determining, in a case where said destination device is determined to be active, whether or not transmission of said electronic message is still required, wherein said step of determining whether or not transmission of said electronic message is still required comprises reference to a message expiry time;
    said originating device transmitting, only in a case where it is determined that said destination device is active and said electronic message is still required, said electronic message to a distribution server, for retransmission thereby to said destination device; and
    said originating device repeating, in a case where said destination device is determined not to be active, said step of determining at predetermined intervals until it is determined that said destination device is active.

2. A system for handling an electronic message, comprising:
    an originating device that originates the electronic message, wherein said originating device comprises a data processor coupled to a memory and operable for executing instructions in the memory to perform steps of:
    identifying a destination device for receipt of said message at an originating device;
    determining at said originating device whether said destination device is active;
    responsive to it being determined that said destination device is active, determining by said originating device whether or not transmission of said electronic message is still required, wherein said determining by said originating device whether or not transmission of said electronic message is still required comprises reference to a message expiry time;
    only in a case where it is determined that said destination device is active and said electronic message is still required, said originating device transmitting said electronic message to a distribution server, for retransmission thereby to said destination device; and
    in a case where said destination device is determined not to be active, said originating device repeating said step of determining at predetermined intervals until it is determined that said destination device is active, wherein said step of determining at said originating device whether said destination device is active comprises interrogating said destination device from said originating device, wherein said interrogation is performed by means of telephony application programming interface commands.

3. A computer program product comprising a tangible computer-readable storage device having stored thereon a computer program for use in a data processing configuration for handling an electronic message, the computer program comprising:
    instructions to identify, at an originating device, a destination device for receipt of said message;
    instructions to determine at said originating device whether said destination device is active;
    instructions, responsive to it being determined that said destination device is active, to determine by said originating device whether or not transmission of said electronic message is still required, wherein said instructions to determine by said originating device whether or not transmission of said electronic message is still required comprises reference to a message expiry time;
    instructions to transmit said electronic message by said originating device to a distribution server only in a case where it is determined that said destination device is active and said electronic message is still required, for retransmission thereby to said destination device; and instructions, responsive to it being determined that said destination device is not active, to repeatedly determine by said originating device whether said destination device is active at predetermined intervals until it is determined that said destination device is active, wherein said instructions to determine at said originating device whether said destination device is active comprises instructions to interrogate said destination device from said originating device, wherein said interrogation is performed by means of telephony application programming interface commands.

\* \* \* \* \*